United States Patent
Roberts et al.

(10) Patent No.: US 9,072,989 B2
(45) Date of Patent: Jul. 7, 2015

(54) UNDERDRAIN FOR A FILTER SYSTEM FOR FILTERING WATER OR WASTEWATER

(75) Inventors: R. Lee Roberts, Rose Valley, PA (US); Troy A. Jackson, Camden-Wyoming, DE (US); Joseph L. Cristaldi, West Chester, PA (US)

(73) Assignee: Roberts Marketing DE, Inc., Wilmington, DE (US)

( * ) Notice: Subject to any disclaimer, the term of this patent is extended or adjusted under 35 U.S.C. 154(b) by 343 days.

(21) Appl. No.: 13/506,852

(22) Filed: May 21, 2012

(65) Prior Publication Data
US 2013/0306542 A1    Nov. 21, 2013

(51) Int. Cl.
*B01D 24/46*    (2006.01)
*B01D 24/22*    (2006.01)
*B01D 24/24*    (2006.01)

(52) U.S. Cl.
CPC ...................................... *B01D 24/24* (2013.01)

(58) Field of Classification Search
CPC .. B01D 24/24; B01D 24/266; B01D 24/4631; B01D 24/4636
USPC .................. 210/274, 275, 279, 291
See application file for complete search history.

(56) References Cited

U.S. PATENT DOCUMENTS

| | | |
|---|---|---|
| 4,214,992 A | 7/1980 | Sasano et al. |
| 4,619,765 A | 10/1986 | Roberts |
| 5,019,259 A | 5/1991 | Hambley |
| 5,068,034 A | 11/1991 | Walter |
| 5,108,627 A | 4/1992 | Berkebile et al. |
| 5,149,427 A | 9/1992 | Brown |
| 5,156,738 A * | 10/1992 | Maxson .................. 210/274 |
| 5,269,920 A | 12/1993 | Brown et al. |
| 5,296,138 A | 3/1994 | Walter |
| 5,328,608 A | 7/1994 | Bergmann et al. |
| 5,462,664 A | 10/1995 | Neuspiel |
| 5,489,388 A | 2/1996 | Brown et al. |
| 5,639,384 A | 6/1997 | Brown et al. |
| 5,865,999 A | 2/1999 | Shea et al. |
| 6,325,931 B1 | 12/2001 | Roberts et al. |
| 6,569,327 B2 | 5/2003 | Roberts et al. |
| 6,740,237 B1 | 5/2004 | Roberts et al. |
| 6,797,166 B1 | 9/2004 | Hambley et al. |

OTHER PUBLICATIONS

"AWI Phoenix Underdrain System", AWI, two pages, prior art to subject patent application.

(Continued)

*Primary Examiner* — Matthew O Savage
(74) *Attorney, Agent, or Firm* — Merek, Blackmon & Voorhees, LLC

(57) ABSTRACT

An apparatus for use in a filter system for filtering water or wastewater. The apparatus includes at least one underdrain lateral. The at least one underdrain lateral has at least an inner chamber, a first outer chamber and a second outer chamber. The first outer chamber and the second outer chamber are preferably in fluid communication with the inner chamber. The inner chamber, the first outer chamber and the second outer chamber are preferably formed by an inner liner and an outer liner. The outer liner is a separate piece from the inner liner and surrounds the inner liner. The inner chamber is preferably configured to simultaneously receive a liquid and a gas during a washing procedure including simultaneous use of a liquid and gas to clean a filter bed to create a liquid and gas interface in the inner chamber.

27 Claims, 8 Drawing Sheets

(56) References Cited

OTHER PUBLICATIONS

Drawing No. D-09-04-412 for City of Water and Sewerage Department, dated Mar. 2012.

Drawing No. D-09-04-413 for City of Water and Sewerage Department, dated Mar. 2012.

* cited by examiner

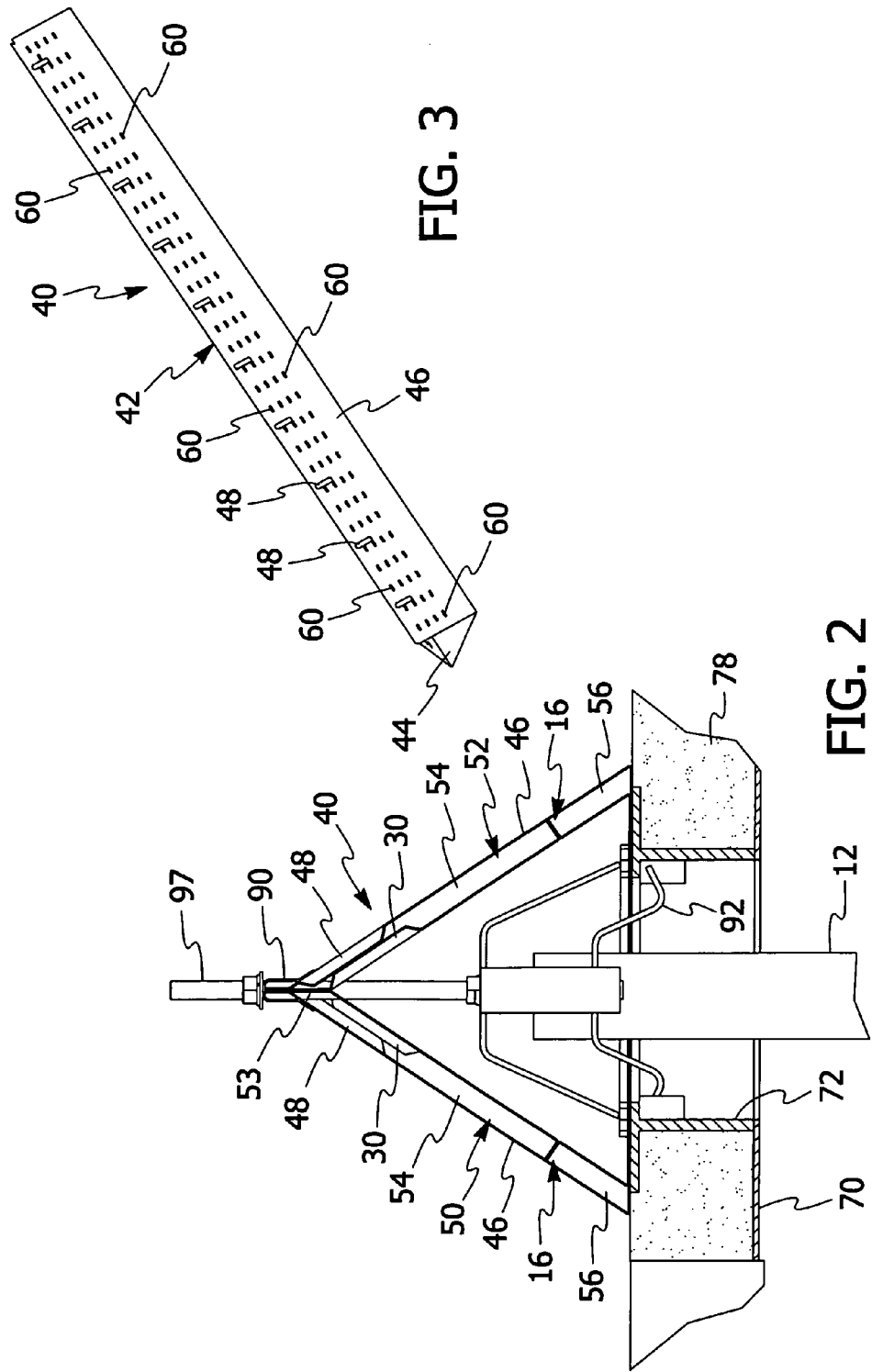

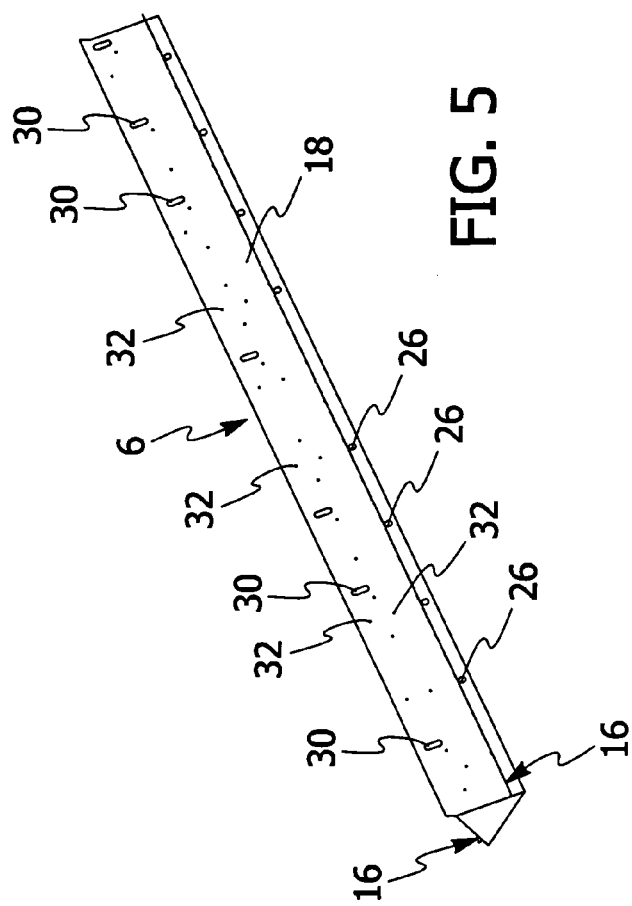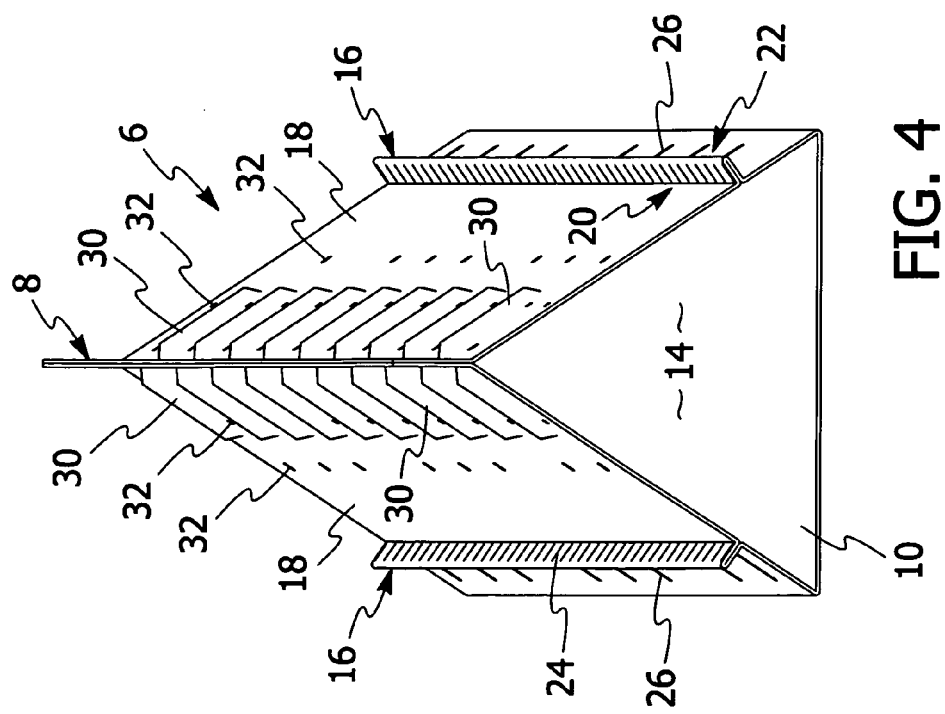

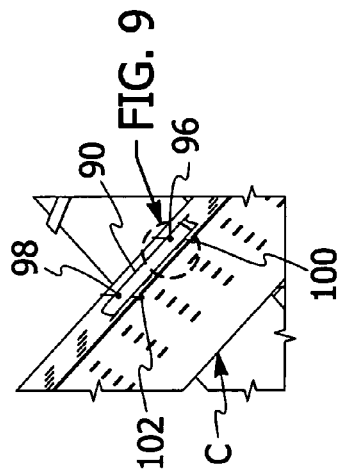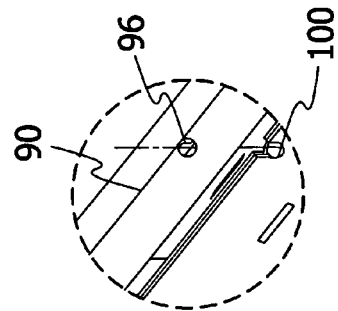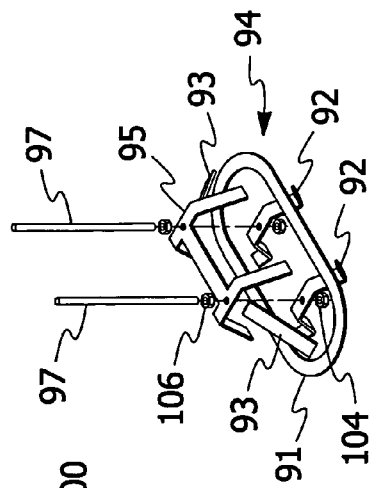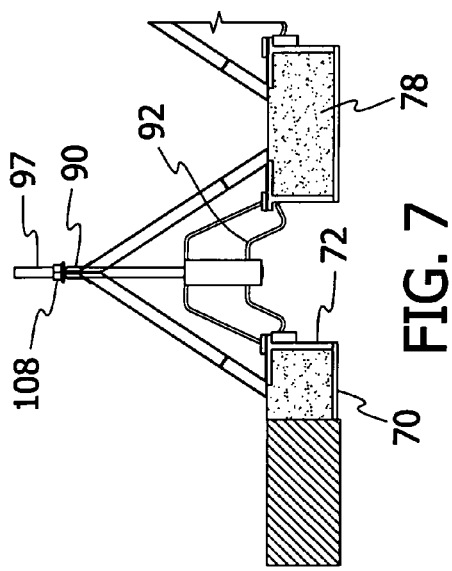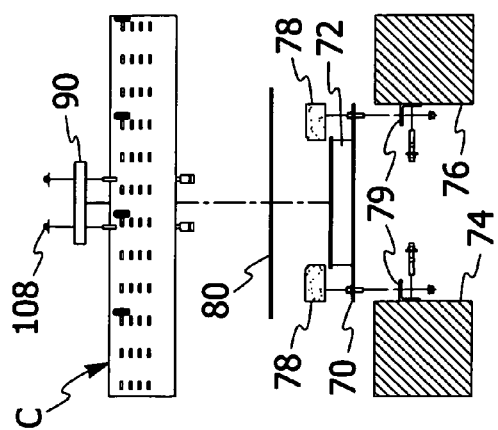

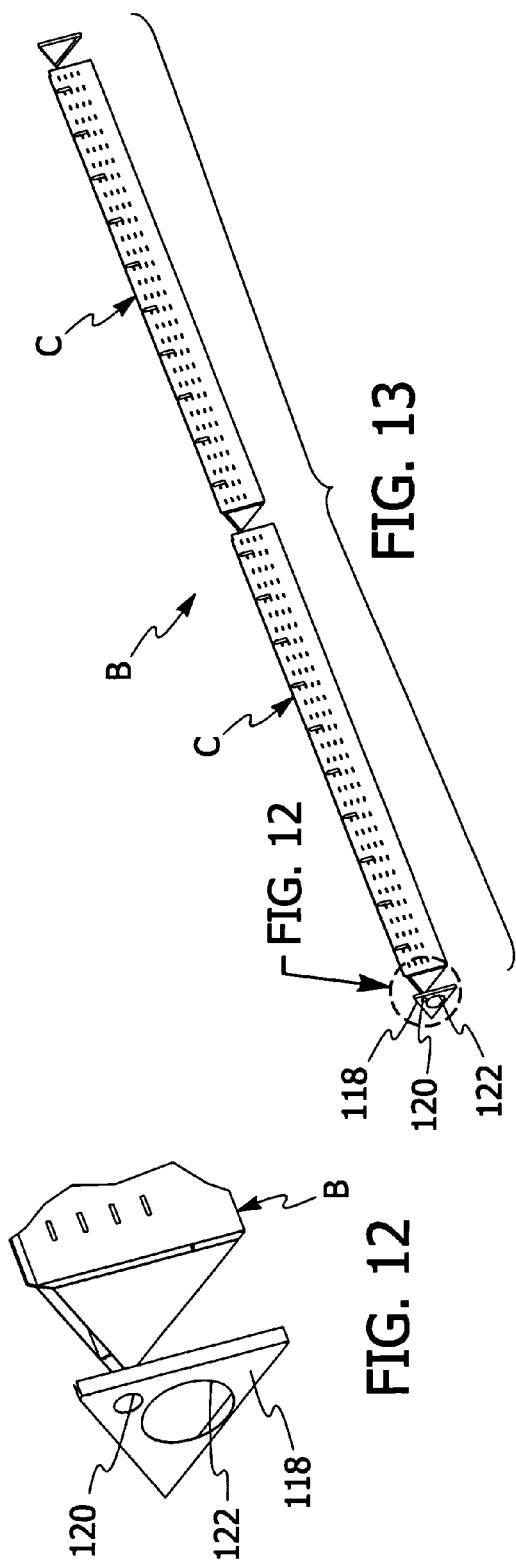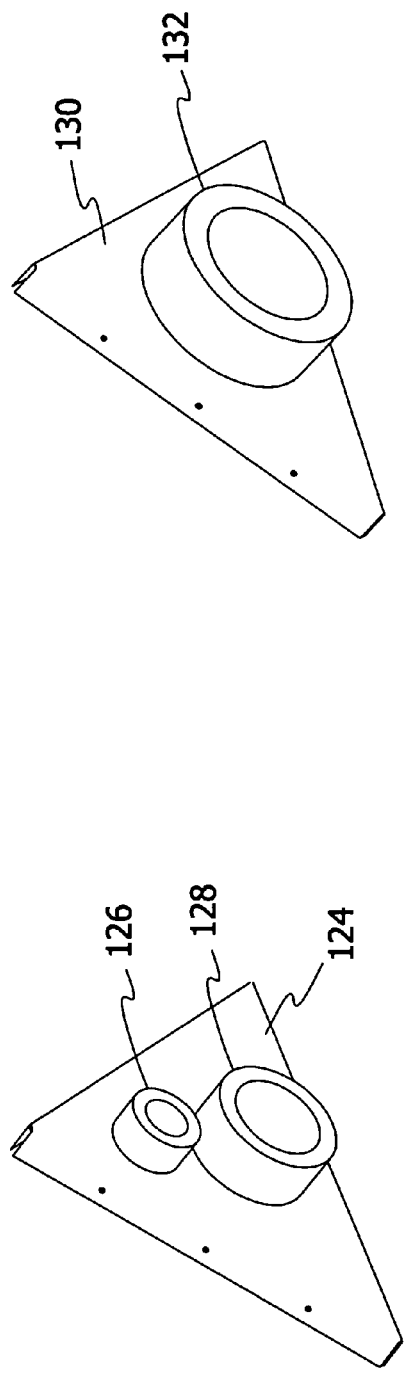

UNDERDRAIN FOR A FILTER SYSTEM FOR FILTERING WATER OR WASTEWATER

FIELD OF THE INVENTION

The present invention is directed to water and/or wastewater filter systems for filtering impurities from a liquid. More particularly, the present invention is directed to an underdrain for a filter system and a method of washing a filter system using the underdrain.

BACKGROUND OF THE INVENTION

Various filter systems have been developed to filter water and wastewater. Typical filter systems include but are not limited to upflow filters, upflow clarifiers, a downflow filter, downflow clarifiers, bi-flow filters as well as various combinations of the aforementioned filter systems. The terms upflow filter and upflow clarifier refer to filter systems in which influent to be filtered is directed in an upward path to remove impurities. Conversely, the terms downflow filter and downflow clarifier refer to filter systems in which the influent is directed in a downward path to remove impurities. Bi-flow filters refer to filter systems in which the influent is directed in both a downward path and an upward path to remove impurities. The upflow filters/clarifiers, downflow filters/clarifiers and bi-flow filters include one or more filter beds formed from one or more layers of filter media. The filter media may be supported by one or more layers of gravel. Alternatively, the one or more gravel layers may be replaced with a porous plate or other direct retention systems.

In a combined system, for example, an upflow filter/clarifier followed by a downflow filter, the influent is initially directed upwardly through the upflow filter/clarifier to remove a predetermined percentage of the impurities in the influent and then directed downwardly through the downflow filter to remove the remaining impurities to within an acceptable limit. Where the filter system includes multiple downflow filters connected in series, the influent is directed downwardly through each of the downflow filters one after the other to remove the impurities within an acceptable limit.

Regardless of the type of granular bed filter system and/or the type of the liquid to be filtered, it is common for the filter system to include an underdrain. The underdrain directs and receives fluids during operation of various cycles of the filter system including the filtration cycle (also referred to as a service run) and a washing cycle. The washing cycle may be performed by directing the washing fluid in a path opposite to the path of influent during the filtration cycle or the washing cycle may be performed by directing the washing fluid in the same path as the path of the influent during the filtration cycle. The washing fluids may include influent, pre-filtered water, air or other suitable gas. A key function of the underdrain is to evenly distribute the washing fluid through the filter bed during the washing cycle so that at least a significant amount of the impurities trapped in the filter can be removed. In the event that the underdrain does not evenly distribute the washing fluid through the filter bed, the filter bed will likely not be properly cleaned. At a minimum, this will cause much shorter filtration cycles and more washing cycles. This is undesirable, as the filter system typically cannot operate in the filtration cycle during a washing cycle.

There are many different types of underdrain systems currently marketed for use in water filtration. Some underdrains are used for water only backwash and some are capable of introducing air only, water only, or simultaneous liquid and air.

A common type of underdrain is the "lateral" style. This type of underdrain is typically made of injection molded or extruded plastic or extruded clay. The underdrain blocks are arranged in rows termed "laterals". The laterals are typically spaced on approximately 12 inch centers leaving an approximately 1 inch space between the laterals. There are two common types of combined air/water lateral type underdrains. One type is configured to introduce air and water into a center compartment that directs the air and water through separate internal orifices into two adjacent, outer compartments. The air and water escape only from the two adjacent, outer compartments into the filter bed from combined air/water orifices in the two adjacent, outer compartments. The two adjacent, outer compartments form in essence dual internal laterals that extend generally the length of the single lateral. This type of system is subject to mal-distribution of one or more of the washing fluids. Specifically, the washing fluid can exit the outer compartments in an uneven manner along the length of the underdrain lateral leading to partial cleaning of the filter media.

Underdrain laterals are subject to uplift forces that tend to separate the underdrain laterals from the filter floor. A common source of this uplift force is due to the upward flow of water and/or air pushing against the filter floor with a force equal and opposite to the resistance of the flow across the underdrain lateral. Should the underdrain laterals become sufficiently separated from the filter floor, the filter will become inoperable. All of the media must be removed and the underdrain repaired or completely removed. This is obviously extremely undesirable. Therefore, one aspect of a preferred embodiment of the present invention is to provide a cost effective manner of anchoring the underdrain laterals to the filter floor.

OBJECTS AND SUMMARY OF THE INVENTION

An object of the present invention is to provide a novel and unobvious underdrain and a method of washing a filter system using the novel and unobvious underdrain.

Another object of a preferred embodiment of the present invention is to provide a lateral type underdrain that ensures uniform distribution a of washing liquid.

A further object of a preferred embodiment of the present invention is to provide an underdrain lateral that ensures uniform distribution of a washing gas.

Yet another object of a preferred embodiment of the present invention is to provide an underdrain lateral that ensures uniform distribution of a washing liquid and a washing gas into a filter bed from at least one chamber having a washing liquid and a washing gas occupying the at least one chamber at the same point in time.

Still another object of a preferred embodiment of the present invention is to provide an anchor assembly for an underdrain that cost effectively prevents underdrain laterals in the underdrain from separating from the filter floor.

Yet still another object of a preferred embodiment of the present invention is to provide an underdrain lateral that has a minimal number of components.

A further object of a preferred embodiment of the present invention is to provide an underdrain lateral that has an inner chamber configured to simultaneously receive both a washing gas and a washing liquid and two outer chambers configured to simultaneously receive both a washing gas and a washing liquid where the inner chamber and two outer chambers are formed from two pieces of material, preferably stainless steel.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to an apparatus for use in a filter system for filtering water or wastewater. The apparatus includes at least one underdrain lateral. The at least one underdrain lateral has at least a first chamber, a second chamber and a third outer chamber. The first chamber and the second outer chamber are in fluid communication with the third chamber. The third chamber is configured to simultaneously receive a liquid and a gas during a washing procedure including simultaneous use of a liquid and gas to clean a filter bed to create a liquid and gas interface in the inner chamber. The first chamber is configured to receive a liquid and a gas from the third chamber during a washing procedure including simultaneous use of a liquid and gas to clean the filter bed to create a liquid and gas interface in the first chamber. A mal-distribution control member is disposed in at least one of the first chamber, the second chamber and the third chamber for preventing mal-distribution of a washing fluid. A first space is formed above the mal-distribution control member and a second space formed below the mal-distribution control member is the corresponding chamber. The first space is in fluid communication with the second space through at least one opening in the mal-distribution control member.

Another preferred embodiment of the present invention is directed to an apparatus for use in a filter system for filtering water or wastewater. The apparatus includes at least one underdrain lateral. The at least one underdrain lateral has at least an inner chamber, a first outer chamber and a second outer chamber. The first outer chamber and the second outer chamber are in fluid communication with the inner chamber. An anchor operably associated with the at least one underdrain lateral for maintaining the at least one underdrain lateral in an operating position and resisting uplift forces generated by a washing fluid passing through at least one of the inner chamber, the first outer chamber and the second outer chamber. At least a portion of anchor extends through the inner chamber.

A further preferred embodiment of the present invention is directed to an apparatus for use in a filter system for filtering water or wastewater. The apparatus includes at least one underdrain lateral. The at least one underdrain lateral has at least an inner chamber, a first outer chamber and a second outer chamber. The first outer chamber and the second outer chamber are in fluid communication with the inner chamber. The inner chamber is defined by at least three walls portions. The inner chamber is disposed between the first outer chamber and the second outer chamber. The first outer chamber has at least a first sidewall portion. The second outer chamber having at least a second sidewall portion. The first sidewall portion and the second sidewall portion are formed by a single piece of metal.

Still a further preferred embodiment of the present is directed to an apparatus for use in a filter system for filtering water or wastewater. The apparatus includes at least one underdrain lateral. The at least one underdrain lateral has at least an inner chamber, a first outer chamber and a second outer chamber. The first outer chamber and the second outer chamber are in fluid communication with the chamber. The inner chamber is configured to simultaneously receive a liquid and a gas during a washing procedure including simultaneous use of a liquid and gas to clean a filter bed to create a liquid and gas interface in the inner chamber. The first outer chamber is configured to receive a liquid and a gas from the inner chamber during a washing procedure including simultaneous use of a liquid and gas to clean the filter bed to create a liquid and gas interface in the first outer chamber. A first mal-distribution control member is disposed in the first outer chamber for preventing mal-distribution of a washing liquid. A second mal-distribution control member is disposed in the first outer chamber for preventing mal-distribution of a washing gas. The first mal-distribution control member is spaced from the second mal-distribution control member. At least one of the first mal-distribution control member and the second mal-distribution control member extends substantially across a width of the first outer chamber.

Still another preferred embodiment of the present invention is directed to an apparatus for use in a filter system for filtering water or wastewater. The apparatus includes at least one underdrain lateral. The at least one underdrain lateral has at least an inner chamber, a first outer chamber and a second outer chamber. The first outer chamber and the second outer chamber are in fluid communication with the inner chamber. The inner chamber is configured to simultaneously receive a liquid and a gas during a washing procedure including simultaneous use of a liquid and gas to clean a filter bed to create a liquid and gas interface in the inner chamber. The first outer chamber is configured to receive a liquid and a gas from the inner chamber during a washing procedure including simultaneous use of a liquid and gas to clean the filter bed to create a liquid and gas interface in the first outer chamber. An inner wall portion disposed in the first outer chamber below the liquid and gas interface in the inner chamber. The inner wall portion has at least one opening. The first outer chamber is operably associated with the inner chamber such that at least a portion of a washing liquid in the inner chamber passes into the first outer chamber below the inner wall portion and travels upwardly in the first outer chamber through an opening in the inner wall portion and exits the first outer chamber above the inner wall portion to pass into the filter bed.

Yet a further preferred embodiment of the present invention is directed to an apparatus for use in a filter system for filtering water or wastewater. The apparatus includes at least one underdrain lateral. The at least one underdrain lateral has at least an inner chamber, a first outer chamber and a second outer chamber. The first outer chamber and said second outer chamber are in fluid communication with the inner chamber. The inner chamber, the first outer chamber and the second outer chamber are formed by an inner liner and an outer liner. The outer liner is a separate piece from the inner liner and surrounds the inner liner. The inner chamber is configured to simultaneously receive a liquid and a gas during a washing procedure including simultaneous use of a liquid and gas to clean a filter bed to create a liquid and gas interface in the inner chamber.

Another preferred embodiment of the present invention is directed to an apparatus for use in a filter system for filtering water or wastewater. The apparatus includes at least one underdrain lateral. The at least one underdrain lateral has at least an inner chamber, a first outer chamber and a second outer chamber. The first outer chamber and the second outer chamber are in fluid communication with the inner chamber. The inner chamber, the first outer chamber and the second outer chamber are formed by an inner liner and an outer liner. The outer liner is a separate piece from the inner liner and surrounding the inner liner. The first out chamber and the second outer chamber are in fluid communication.

A further preferred embodiment of the present invention is directed to an apparatus for use in a filter system for filtering water or wastewater. The apparatus includes at least one underdrain lateral. The at least one underdrain lateral has at least one chamber for receiving at least one of a washing liquid and a washing gas. The at least one chamber has an uppermost portion. An anchor is operably associated with the at least one underdrain lateral for maintaining the at least one underdrain lateral in an operating position and resisting uplift forces generated by a washing fluid passing through the at least one chamber. At least a first portion of the anchor extends through the at least one chamber. The anchor is configured to have a first anchoring point outside of the at least one chamber and adjacent the uppermost portion of the at least one chamber and a second anchoring point disposed in a flume of a filter bottom. An alignment collar is connected to the underdrain lateral to prevent misalignment of the first portion of the anchor as the first portion of the anchor is inserted into the at least one chamber.

BRIEF DESCRIPTION OF THE DRAWINGS

FIG. 2 is a cross-sectional view of an underdrain lateral formed in accordance with the preferred embodiment illustrated in FIG. 1.

FIG. 3 is a perspective view of an outer liner of the preferred underdrain lateral illustrated in FIG. 1.

FIG. 4 is a perspective view of an inner liner of the preferred underdrain lateral illustrated in FIG. 1.

FIG. 5 is another perspective view of an inner liner of the preferred underdrain lateral illustrated in FIG. 1.

FIG. 7 through 11 are views of various aspects of the preferred anchor assembly.

FIGS. 12 and 13 illustrate an alternative means to supply a washing fluid to the preferred underdrain laterals.

FIG. 14 is another alternative end cap for the preferred underdrain laterals.

FIG. 15 is a further alternative end cap for the preferred underdrain laterals.

DETAILED DESCRIPTION OF THE PREFERRED EMBODIMENTS OF THE INVENTION

The preferred forms of the invention will now be described with reference to FIGS. 1-18. The appended claims are not limited to the preferred forms and no term and/or phrase used herein is to be given a meaning other than its ordinary meaning unless it is expressly stated that the term and/or phrase shall have a special meaning. The term filter as used herein is broadly interpreted to include a device in which at least a portion of the impurities in a liquid are removed including but not limited to a clarifier, a polishing filter and/or a contactor.

FIGS. 1-11

Figure 1:
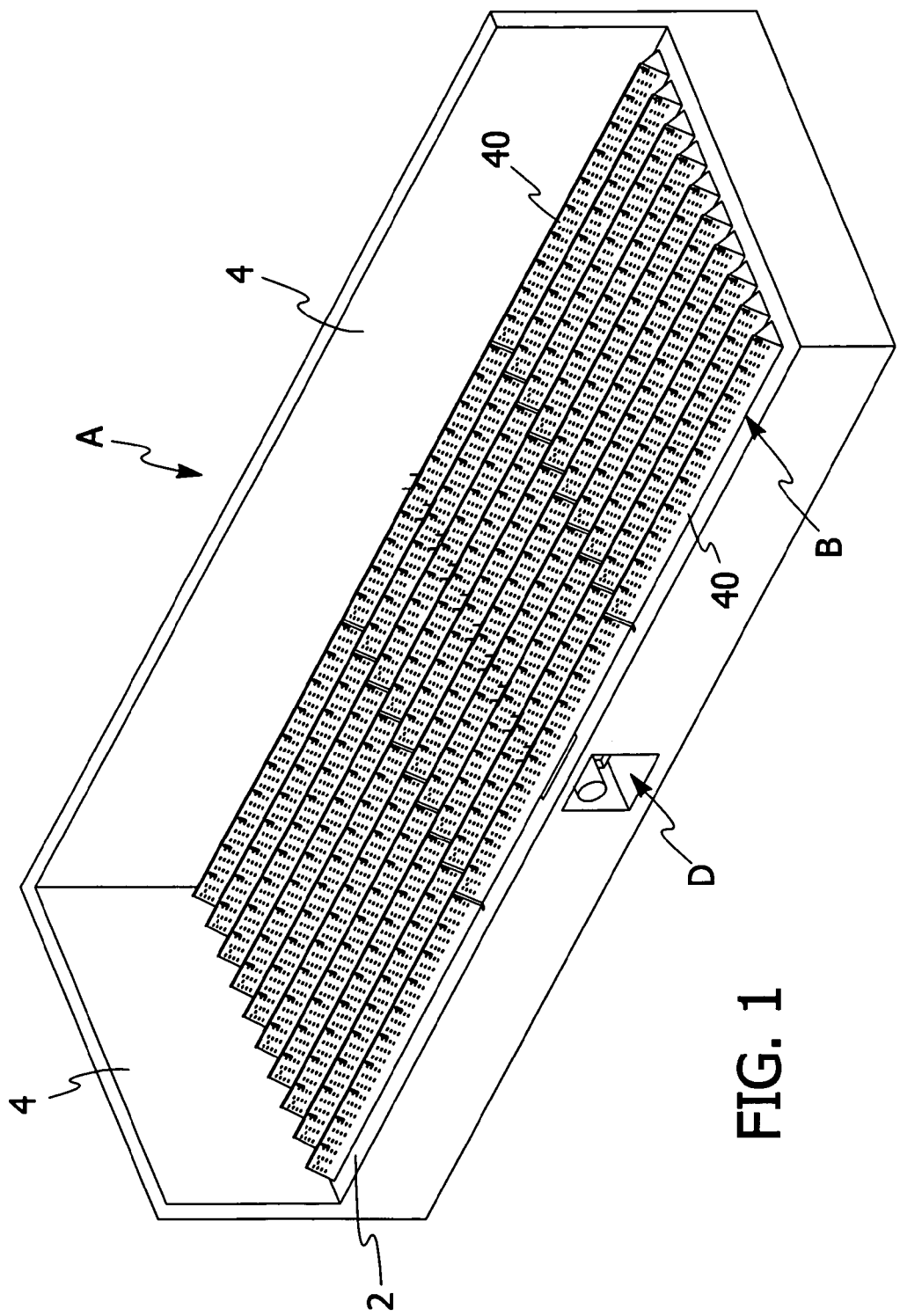
FIG. 1 is a fragmentary perspective view of a filter (with filter media removed) with underdrain laterals formed in accordance with a preferred embodiment of the present invention.

Referring to FIG. 1, a portion of filter A having a floor 2 and four filter walls 4 (only two of which are shown) includes a plurality of underdrain laterals B formed in accordance with a preferred embodiment of the present invention. The filter media has been removed so that the underdrain laterals can be readily seen. It is to be noted that FIG. 1 depicts one of numerous possible configurations of the present invention. It should be noted that the filter A can be formed from any suitable material including but not limited to concrete and stainless steel or other metal. Further, filter A can take any shape as desired including but not limited to square, rectangular and circular. The number of underdrain laterals B that are used in any given underdrain system will depend on the size of the filter.

Preferably, each of the underdrain laterals B are formed from a plurality of blocks C placed end to end with the joints between adjacent blocks C sealed by any suitable sealing method. However, underdrain laterals B may be formed from one long underdrain block C. The underdrain blocks C, in the most preferred embodiment, are formed from stainless steel. However, any suitable material may be used. Preferably, each of the underdrain blocks C are formed in a similar manner and, therefore, only one underdrain block C will be described in detail.

Referring to FIGS. 1 to 11, the preferred form of underdrain block C will now be described. The two main components of underdrain block C are an inner liner 6 seen in for example FIGS. 4 and 5. Preferably, the inner line 6 is formed from a single piece of stainless steel. Apex 8 of liner 6 includes to vertically extending portions that mate flush to each other. The apex 8 can be sealed in any known manner including resistance welding. The base 10 of the liner 6 includes a plurality of openings (not shown) along the length of the liner 6 to receive a washing liquid from center flume D. It should be noted that the present invention is not limited to use with center type flumes but can be used in any filter system including filter systems that do not have a flume. The openings in base 10 preferably receive a gas conduit 12 (see FIG. 2) so that the inner liner 6 can receive a washing gas including but not limited to air from flume D. As readily evident from the above discussion, chamber 14 formed by the inner liner 6 simultaneously receives a liquid and a gas during a backwash using simultaneous liquid and gas. It should be noted, that the present invention is not limited to filter systems employing a simultaneous liquid and gas washing procedure. Rather, the present invention can be used in filter systems employing any of the following washing procedures: (i) a separate liquid and gas washing procedure; (ii) a liquid only washing procedure; (iii) a gas only washing procedure; (iv) and a washing procedure that employs simultaneous liquid and gas for at least a portion of the washing procedure.

A liquid mal-distribution member 16 is formed in each inclined sidewall 18 of liner 6, or inner sidewalls 18 of the block C. Preferably, members 16 are positioned below the gas/liquid interface formed in chamber 14 when a simultaneous liquid and gas washing procedure is employed. In the most preferred embodiment, each liquid mal-distribution member 16 is formed by folding an appropriate portion of the single piece of stainless steel so that each liquid mal-distribution member has two abutting segments of stainless steel, an upper segment or second wall portion 20 and a lower segment or first wall portion 22 that are joined together at the fold which forms a peak, with a plurality of openings 24 or slots formed in each of the abutting segments of stainless steel. Preferably, each opening in the upper segment 20 is aligned with an opening formed in the lower segment 22. As explained in more detail below, this arrangement of openings in liquid mal-distribution members 16, will allow a washing liquid to pass through the mal-distribution members 16 after exiting chamber 14 through openings 26 formed in the lower portions of sidewalls 18 of liner 6. The number, shape and spacing between openings 26 may be varied as desired. Moreover, the openings 26 may be knock-outs with only a portion of the knock-out connected to the corresponding sidewall 18 while other portions of the knock-out are detached from the corresponding sidewall 18 creating an opening for fluid to pass through. The knock-outs can be inwardly or outwardly extending with respect to chamber 14, i.e., the knock-outs could extend outwardly from chamber 14 or could extend into chamber 14.

A plurality of gas mal-distribution members 30 are formed in each inclined sidewall 18 of liner 6. Preferably, members 30 are outwardly extending protrusions formed in the single piece of stainless steel forming liner 6. Preferably, members 16 are positioned above the gas liquid interface formed in chamber 14 when a simultaneous liquid and gas washing procedure is employed. A plurality of openings 32 are formed around members 30 for allowing a washing gas to exit chamber 14 when a washing gas is used in the washing procedure. The number, size and shape of openings 32 may be vary as desired.

The second main component of blocks C is outer liner 40 as seen in for example, FIGS. 1, 2, 3 and 6. Liner 40 is preferably formed from a single piece of stainless steel. Apex 42 of liner 40 includes two vertically extending portions that mate flush to each other. The apex 42 can be sealed in any known manner including resistance welding. The base 44 of the liner 40, or bottom outer wall of the block C, includes a plurality of openings (not shown) along the length of the liner 40. Each of the openings in base 44 is aligned with a corresponding opening in base 10 of liner 6 to allow a washing liquid to flow from the flume D into chamber 14 of liner 6. The openings in base 44 preferably receive a gas conduit 12 (see FIG. 2) so that the inner liner 6 can receive a washing gas including but not limited to air from flume D. As shown in FIG. 2, outer sidewalls 46 of the block C are inclined inwardly towards each other so that each of the outer sidewalls 46 forms an acute angle with the bottom outer wall 44. As shown in FIGS. 2 and 4, inner sidewalls 18 of the block C are inclined inwardly towards each other so that each of the inner sidewalls forms an acute angle with the bottom outer wall. As shown in FIGS. 2 and 4, planes of the first and second wall portions of mal-distribution members 16 form an acute angle with the bottom outer wall 44 and the peaks of the members 16 are disposed adjacent to the respective outer sidewall 46. Each inwardly inclined sidewall 46 of liner 40 includes a plurality of inwardly extending protrusions 48. Preferably, each inwardly extending protrusion 48 is aligned with and abuts a corresponding outwardly extending protrusion 30 formed in the sidewalls 18 of liner 6.

As seen in FIG. 2, outer liner 40 surrounds inner liner 6 forming two outer chambers 50 and 52 on opposite sides of chamber 14. Chamber 50 can communicate but is not required to communicate with chamber 52 at the apex of the underdrain block C. However, as shown in FIG. 2, chamber 50 does not communicate with chamber 52 at the apex as wall 53 formed by apex 8 of liner 6 separates the two outer chambers 50 and 52. However, openings can be readily formed in wall 53 to permit communication between chamber 50 and chamber 52. Each of the chambers 50 and 52 have an upper compartment 54 formed above member 16 and a lower compartment 56 formed below member 16. Each of the lower compartments 56 receives a washing liquid from inner chamber 14 through openings 26 during a washing procedure including a washing liquid.

Openings may be formed in sidewalls 46 of outer liner 40 below members 16 to allow some liquid in lower compartments 56 to directly enter the filter bed. The filter bed may include one or more layers of filter media supported by one or more layers of gravel. The bulk of the washing liquid in lower compartments 56 will travel through the openings 24 in the corresponding distribution member 16 and enter the corresponding upper compartment 54. The washing liquid exits upper compartment 54 through a plurality of openings or slots 60. Forcing the bulk of the washing liquid entering lower compartment 56 through members 16 before exiting block C, directly results in a significant reduction of mal-distribution of the washing liquid.

When a washing liquid and washing gas are simultaneously used to wash a filter bed, a gas/liquid interface will be formed in chamber 14 above members 16. The gas will exit chamber 14 through the openings 32 formed in sidewalls 18 above members 16 into upper compartments 54. A liquid/gas interface will in turn be formed in each of the upper compartments 54. The washing gas will exit compartments 54 above the corresponding gas/liquid interface and pass into the filter bed. However, prior to exiting upper compartments 54, the washing gas travels around the mating protrusions 30 and 48 and upwardly through the channels formed between adjacent pairs of mating protrusions 30 and 48. In this manner, mal-distribution of the washing gas is greatly reduced.

Figure 6:
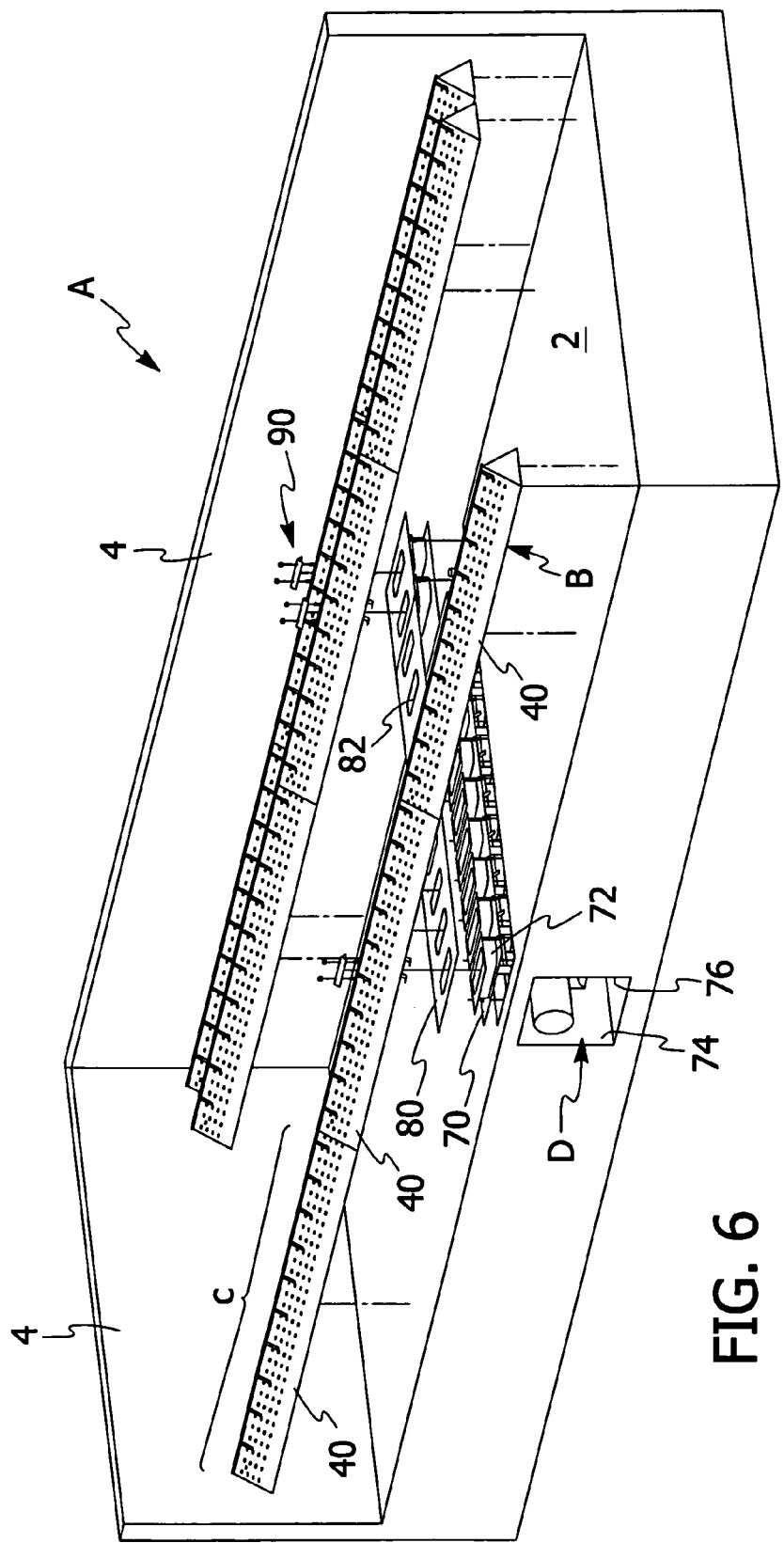
FIG. 6 is an exploded view of the embodiment illustrated in FIG. 1.

Referring to FIGS. 2 and 6 to 11, one preferred manner of anchoring underdrain blocks C will now be described. Referring to FIGS. 6 and 8, a flume distribution plate 70 having a plurality of fluid guides or collars 72 extending upwardly from the flume distribution plate. Each fluid guide or collar 72 is associated with one underdrain lateral as shown in FIGS. 2 and 7. While these figures depict the guide or collar 72 disposed outside of the corresponding block C, it should be noted that collar 72 can extend in the corresponding underdrain block. In the case of an existing flume, the flume distribution plate 70 can be fixed to sidewalls 74 and 76 of flume D by angle brackets 79 and bolts illustrated in FIG. 8. However, it should be readily appreciated that numerous other fastening arrangements may be used. Grout 78 is preferably poured around the collars 72 to provide a tight seal between the flume and plate 70. A sealing plate 80 (FIG. 6) is placed over plate 70 as shown in FIG. 6. Sealing plate 80 has a plurality of openings 82 that align with collars 72. Preferably, sealing plate 80 is not fixed to plate 70. Sealing plate 80 enhances the seal around flume D. In new installations, where the filter housing is formed from concrete, plate 70 may be embedded directly in the floor of the filter adjacent or in the flume.

The anchor assembly of the present invention uses each of the collars 72 to create a lower anchor point in the flume to secure each underdrain lateral B to the floor 2 of the filter. Referring to FIGS. 2 and 6 to 11, the preferred anchor assembly includes a top support plate 90 that mates with the upper portion of block C and a pair of lower support clips 92 that engage an inner surface of collars 72 as seen in for example FIG. 2. An internal mounting frame 94 is disposed in chamber 14 of liner 6 and seats on the inner surface of the base 10. While FIG. 11 shows mounting frame 94 in an exploded view, the elements 91, 93, 95 making up this member are fixed to each other by welding or any other suitable means. Two threaded bolts 97 pass through openings 96 and 98 of plate 90 and openings 100 and 102 of block C. Three nuts 104, 106 and 108 are associated with each bolt 97 to firmly anchor block C to the floor 2 of the filter.

Figure 17:
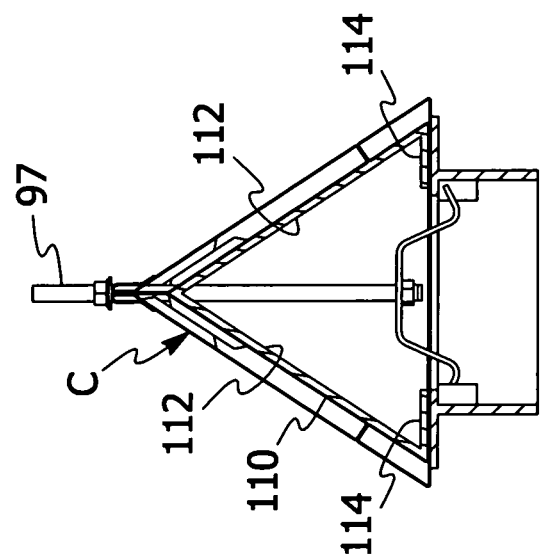
FIG. 17 is a cross-sectional view of a preferred underdrain lateral with the alternative form of anchor assembly illustrated in FIG. 16.
Figure 16:
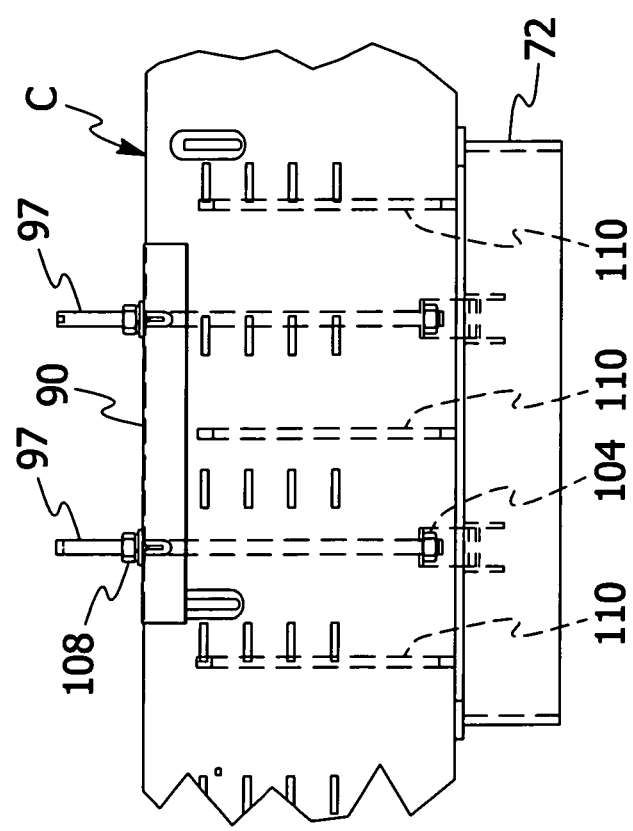
FIG. 16 is an elevation view of an alternative form of anchor assembly.

FIGS. 16 and 17

Another preferred anchoring assembly is shown in FIGS. 16 and 17. This anchoring system is similar to the assembly describe above and, therefore, only the differences will be described in detail. Like elements are given the same references numerals. In this assembly, nuts 106 and internal mounting frame 94 have been omitted. A plurality of internal support members 110 (three of which are shown in FIG. 16) are positioned in chamber 14. The support members 110 include two inclined sidewalls 112 that mate with the sidewalls of liner 6 to provide internal support. The support members 110 each include leg 114 extending inwardly from the corresponding sidewall 112. As seen in FIG. 17, a large gap exists between legs 114 to allow for the free flow of a washing fluid into block C.

FIGS. 12 Through 15

FIGS. 12 through 15 illustrate alternative means to connect the underdrain block to a washing fluid supply where a flume is not used as the washing fluid supply source. FIGS. 12 and 13 illustrate and end cap 118 having an upper air opening 120 and a lower liquid 122 opening to allow the underdrain lateral B to be readily connected to an air pipe and a water pipe.

FIG. 14 illustrates an end cap 124 having a preformed air collar 126 and a preformed water collar 128 to assist in connecting both water and air supplies to underdrain lateral B.

FIG. 15 illustrates an end cap 130 having a large water collar 132 to facilitate connection of the underdrain lateral B to a water supply.

Figure 18:
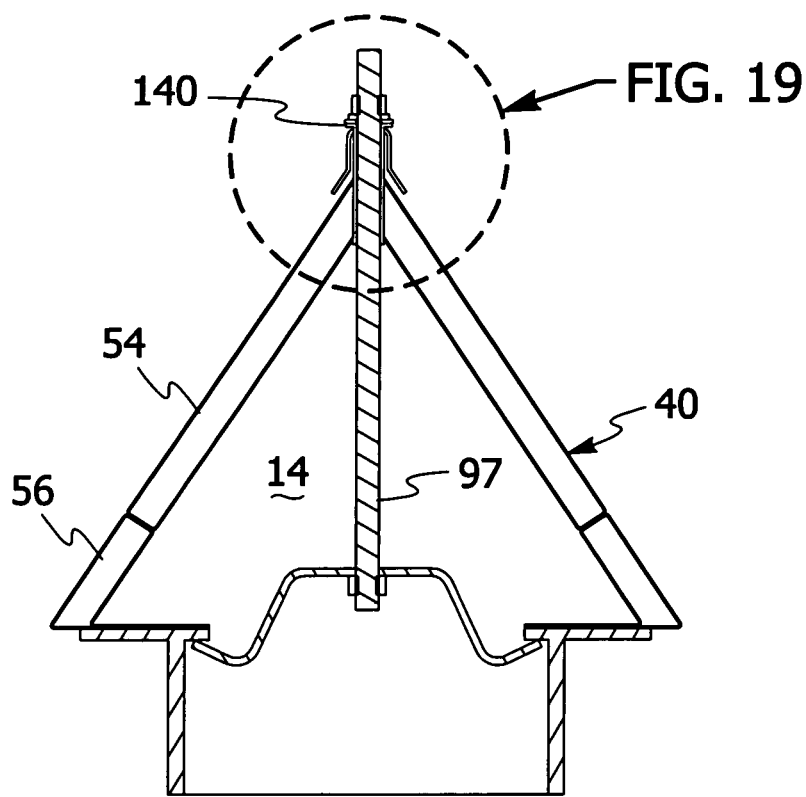
FIG. 18 is a cross-sectional view of a preferred form of misalignment prevention collar.
Figure 19:
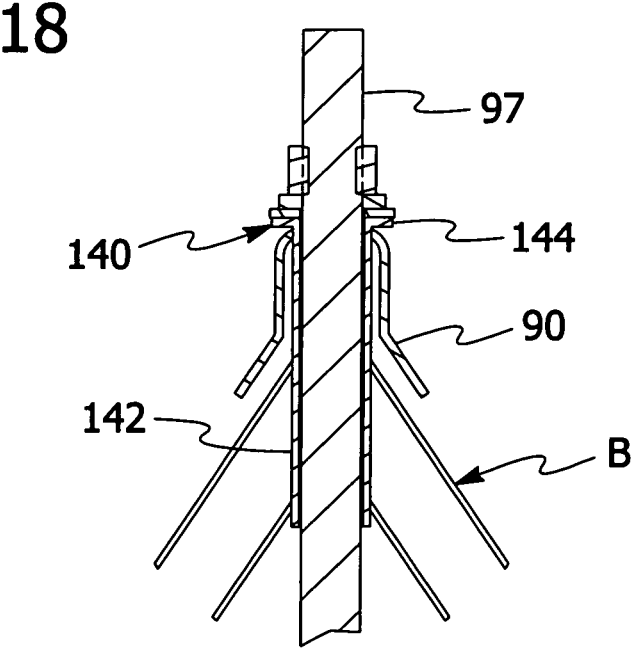
FIG. 19 is an enlarged cross-sectional view of the portion of FIG. 18 within the dashed lines.

FIGS. 18 and 19

FIGS. 18 and 19 disclose a preferred misalignment prevention collar 140 that can be used with the preferred forms of the underdrains disclosed herein. Collar 140 includes a downwardly extending cylindrical sleeve 142 that receives threaded bolt 97 and maintain the bolt in a vertical axis preventing any misalignment of the bolt 97. Collar 140 further includes a circular lip 144 disposed at the top of apex of outer liner 40. Lip 144 engages top support plate 90 as the anchor assembly is tightened to securely connect the underdrain laterals B to the floor 2 of the filter. It should be noted that collar 140 can take many different forms and can be positioned in other areas including the bottom of the underdrain blocks C.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. An apparatus for use in a filter system for filtering water or wastewater, said apparatus comprising:
    (a) at least one underdrain lateral, said at least one underdrain lateral having a first outer sidewall, a second outer sidewall, a bottom outer wall and at least one inner wall forming at least a first chamber, a second chamber and a third chamber, said first chamber and said second chamber being in fluid communication with said third chamber, said first outer sidewall and said second outer sidewall being inclined inwardly such that said first outer sidewall forms an acute angle with said bottom outer wall and said second outer sidewall forms an acute angle with said bottom outer wall;
    (b) said third chamber being configured to simultaneously receive a liquid and a gas during a washing procedure including simultaneous use of a liquid and gas to clean a filter bed to create a liquid and gas interface in said third chamber;
    (c) said first chamber being configured to receive a liquid and a gas from said third chamber during a washing procedure including simultaneous use of a liquid and gas to clean the filter bed to create a liquid and gas interface in said first chamber; and,
    (d) a first mal-distribution control member being disposed in said first chamber for preventing mal-distribution of a washing fluid, a first space being formed above said first mal-distribution control member and a second space formed below said first mal-distribution control member in said first chamber.

2. An apparatus as set forth in claim 1, wherein:
    (a) said second chamber being configured to receive a liquid and a gas from said third chamber during a washing procedure including simultaneous use of a liquid and gas to clean the filter bed to create a liquid and gas interface in said second chamber, said third chamber is an inner chamber and said first chamber and said second chamber are outer chambers; and,
    (b) a second mal-distribution control member being disposed in said second chamber for preventing mal-distribution of a washing fluid, said second outer chamber having a first space formed above said second mal-distribution control member and a second space formed below said second mal-distribution control member.

3. An apparatus as set forth in claim 1, wherein:
    (a) a single piece of metal forms said first mal-distribution control member and a wall of said first chamber, said first chamber is an outer chamber.

4. An apparatus as set forth in claim 3, wherein:
    (a) a fold in said single piece of metal forms said first mal-distribution control member.

5. An apparatus as set forth in claim 1, wherein:
    (a) said third chamber is formed by at least a bottom inner wall, a first inner sidewall and a second inner sidewall, said bottom inner wall abuts and rests on said bottom outer wall.

6. An apparatus as set forth in claim 5, wherein:
    (a) said first inner sidewall extends substantially parallel to said first outer sidewall and said second inner sidewall extends substantially parallel to said second outer sidewall.

7. An apparatus as set forth in claim 1, wherein:
    (a) said first chamber and said second chamber each have a substantially uniform width.

8. An apparatus for use in a filter system for filtering water or wastewater, said apparatus comprising:
    (a) at least one underdrain lateral, said at least one underdrain lateral having a first outer sidewall, a second outer sidewall, a bottom outer wall and at least one inner wall forming at least an inner chamber, a first outer chamber and a second outer chamber, said first outer chamber and said second outer chamber being in fluid communication with said inner chamber, said first outer sidewall being inclined inwardly toward said second outer sidewall and said second outer sidewall being inclined inwardly toward said first outer sidewall; and,
    (b) a first mal-distribution control member being disposed in said first outer chamber for preventing mal-distribution of a washing liquid, a second mal-distribution control member being disposed in said second outer chamber for preventing mal-distribution of a washing liquid, said first outer chamber and said second outer chamber each having a first space formed above the corresponding mal-distribution control member and a second space formed below the corresponding mal-distribution control member.

9. An apparatus as set forth in claim 8, wherein:
(a) said first outer chamber and second outer chamber each have a substantially uniform width.

10. An apparatus as set forth in claim 8, wherein:
(a) said first mal-distribution control member in said first outer chamber and said second mal-distribution control member in said second outer chamber each include an upper portion and a lower portion, said upper portion and second lower portion each having a plurality of openings, the second space of said first outer chamber is larger than the first space of and said first outer chamber and the second space of said second outer chamber is larger than the first space of said second outer chamber.

11. An apparatus as set forth in claim 10, wherein:
(a) said upper portion and said lower portion are formed from a single piece of metal.

12. An apparatus as set forth in claim 11, wherein:
(a) said first outer sidewall and said second outer sidewall are formed by a single piece of metal.

13. An apparatus as set forth in claim 8, wherein:
(a) said inner chamber includes a bottom inner wall, a first inner sidewall and a second inner sidewall, said bottom inner wall abuts and rests on said bottom outer wall.

14. An apparatus as set forth in claim 8, wherein:
(a) said at least one underdrain lateral is substantially triangular in shape.

15. An apparatus as set forth in claim 8, wherein: (a) said at least one underdrain lateral includes an inner liner formed by said at least one inner wall and an outer liner formed by said outer walls, said inner liner and said outer liner are substantially triangular in shape.

16. An apparatus for use in a filter system for filtering water or wastewater, said apparatus comprising:
(a) at least one underdrain lateral, said at least one underdrain lateral having a first outer sidewall, a second outer sidewall, a bottom outer wall and at least one inner wall forming at least an inner chamber, a first outer chamber and a second outer chamber, said first outer chamber and said second outer chamber being in fluid communication with said inner chamber;
(b) said at least one inner wall including a first inner sidewall and a second inner sidewall, said first inner sidewall forming an acute angle with said bottom outer wall and said first outer sidewall forming an acute angle with said bottom outer wall;
(c) said inner chamber being disposed between said first outer chamber and said second outer chamber; and,
(d) a first mal-distribution control member being disposed in said first outer chamber for preventing mal-distribution of a washing liquid, said first outer chamber having a first space formed above said first mal-distribution control member and a second space formed below said first mal-distribution control member.

17. An apparatus as set forth in claim 16, wherein:
(a) said second inner sidewall forming an acute angle with said bottom outer wall and said second outer sidewall forming an acute angle with said bottom outer wall.

18. An apparatus as set forth in claim 16, wherein:
(a) said second space is smaller than said first space and said at least one inner wall further includes a bottom inner wall, said bottom inner wall engages and rests on said bottom outer wall.

19. An apparatus as set forth in claim 16, wherein:
(a) said first outer chamber and said second outer chamber each have a substantially uniform width.

20. An apparatus as set forth in claim 16, wherein:
(a) said first outer chamber and said second outer chamber are inclined inwardly.

21. An apparatus as set forth in claim 16, wherein:
(a) said first inner sidewall extends substantially parallel to said first outer sidewall and said second inner sidewall extends substantially parallel to said second outer sidewall.

22. An apparatus for use in a filter system for filtering water or wastewater, said apparatus comprising:
(a) at least one underdrain lateral, said at least one underdrain lateral having a first outer sidewall, a second outer sidewall, a bottom outer wall and at least one inner wall forming at least an inner chamber, a first outer chamber and a second outer chamber, said first outer chamber and said second outer chamber being in fluid communication with said inner chamber;
(b) said inner chamber being configured to receive a fluid during a washing procedure;
(c) said first outer chamber and said second outer chamber being configured to receive the fluid during the washing procedure; and,
(d) a first mal-distribution control member being disposed in said first outer chamber for preventing mal-distribution of the fluid, said first mal-distribution member having a first wall portion joined to a second wall portion at a first peak, said first wall portion and said second wall portion each having a plurality of openings, said first wall portion being disposed below said second wall portion, a plane of said first wall portion forming an acute angle with said bottom outer wall, said first peak being disposed adjacent said first outer sidewall.

23. An apparatus as set forth in claim 22, wherein:
(a) said first wall portion of said first mal-distribution member extends substantially across a width of said first outer chamber.

24. An apparatus as set forth in claim 23, wherein:
(a) said inner wall of said first outer chamber forms an outer wall of said inner chamber.

25. An apparatus as set forth in claim 22, wherein:
(a) said first outer sidewall and said second outer sidewall are each inclined inwardly such that said first outer sidewall forms an acute angle with said bottom outer wall and said second outer sidewall forms an acute angle with said bottom outer wall.

26. An apparatus for use in a filter system for filtering water or wastewater, said apparatus comprising:
(a) at least one underdrain lateral, said at least one underdrain lateral having a first outer sidewall, a second outer sidewall, a first inner sidewall, a second inner sidewall and a bottom wall forming at least a first chamber, a second chamber and a third chamber, said first chamber and said second chamber being in fluid communication with said third chamber, said first outer sidewall and said second outer sidewall being inclined inwardly such that said first outer sidewall forms an acute angle with said bottom wall and said second outer sidewall forms an acute angle with said bottom wall, said first inner sidewall and said second inner sidewall being inclined inwardly such that said first inner sidewall forms an acute angle with said bottom wall and said second inner sidewall forms an acute angle with said bottom wall;
(b) a first wall portion for preventing mal-distribution of a washing fluid, said first wall portion having a plurality of openings, said first wall portion being disposed in said first outer chamber such that an upper segment of said first outer chamber is formed above said first wall portion and a lower segment of said first outer chamber is formed below said first wall portion; and, (c) a second wall portion for preventing mal-distribution of a washing fluid, said second wall portion having a plurality of openings, said second wall portion being disposed in said second outer chamber such that an upper segment of said second outer chamber is formed above said second wall portion and a lower segment of said second outer chamber is formed below said second wall portion.

27. An apparatus as set forth in claim 26, wherein:
(a) said first inner sidewall extends substantially parallel to said first outer sidewall and said second inner sidewall extends substantially parallel to said second outer sidewall.

\* \* \* \* \*

UNITED STATES PATENT AND TRADEMARK OFFICE
CERTIFICATE OF CORRECTION

PATENT NO.        : 9,072,989 B2
APPLICATION NO.   : 13/506852
DATED             : July 7, 2015
INVENTOR(S)       : R. Lee Roberts, Troy A. Jackson and Joseph L. Cristaldi Page 1 of 1

It is certified that error appears in the above-identified patent and that said Letters Patent is hereby corrected as shown below:

In the Specification
Column 3, lines 25 and 26, "second space formed below" now reads -- second space is formed below --.
Column 3, line 26, "is" now reads -- in --.
Column 3, line 64, "the chamber" now reads -- the inner chamber --.
Column 4, line 30, "wall portion disposed" now reads -- wall portion is disposed --.
Column 9, line 19, "illustrate and end" now reads -- illustrate an end --.
Column 9, line 20, "liquid 122 opening" now reads -- liquid opening 122 --.

In the Claims
Column 11, Claim 10, line 15, "second" now reads -- said --.
Column 11, Claim 10, line 16, "space of and said" now reads -- space of said --.

Signed and Sealed this
Third Day of May, 2016

Michelle K. Lee
*Director of the United States Patent and Trademark Office*